June 28, 1955 R. T. ERBAN 2,711,669
PROJECTION APPARATUS
Filed July 28, 1950 3 Sheets-Sheet 1

Fig.1-A

INVENTOR.
Richard Erban

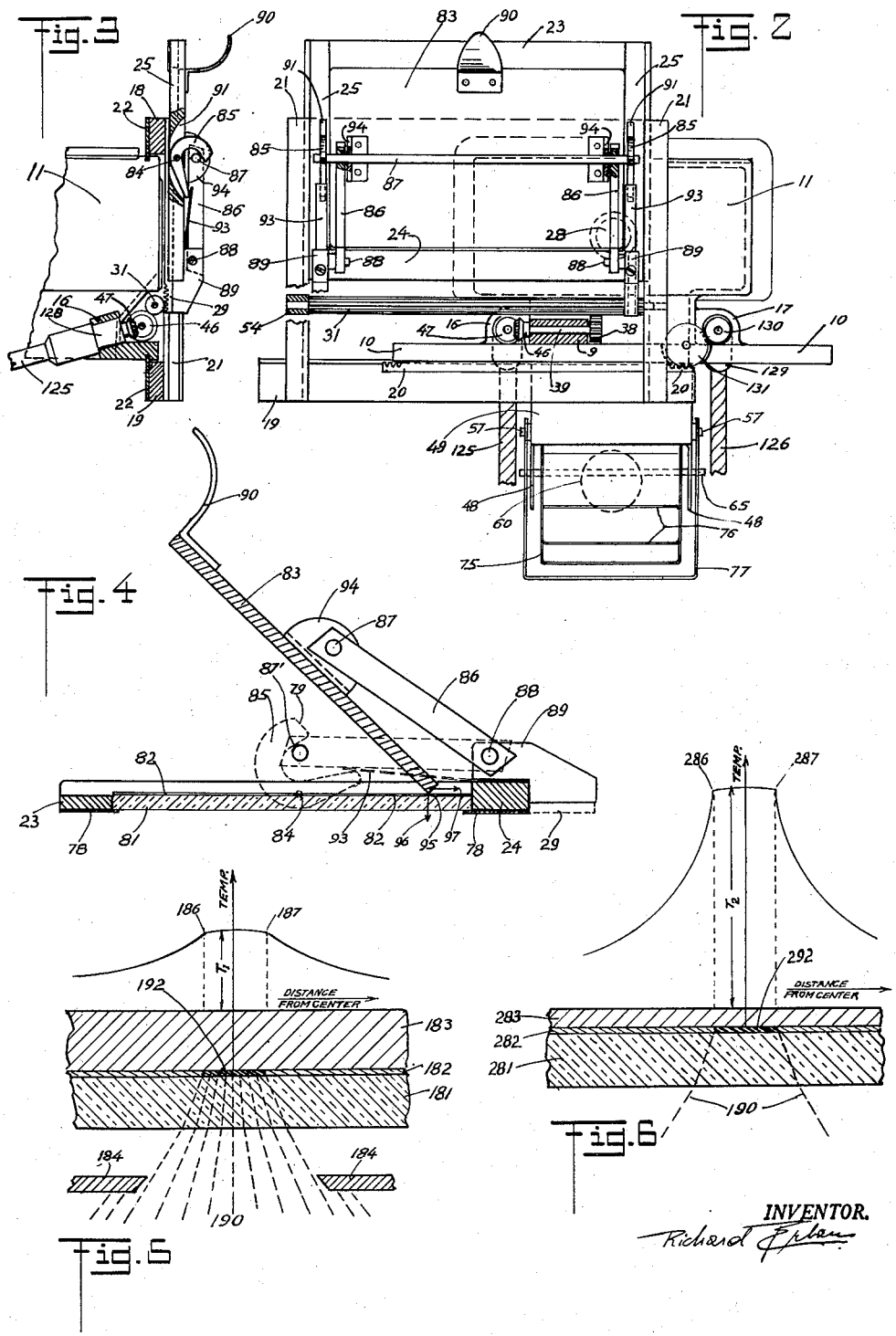

June 28, 1955     R. T. ERBAN     2,711,669
PROJECTION APPARATUS
Filed July 28, 1950     3 Sheets-Sheet 3
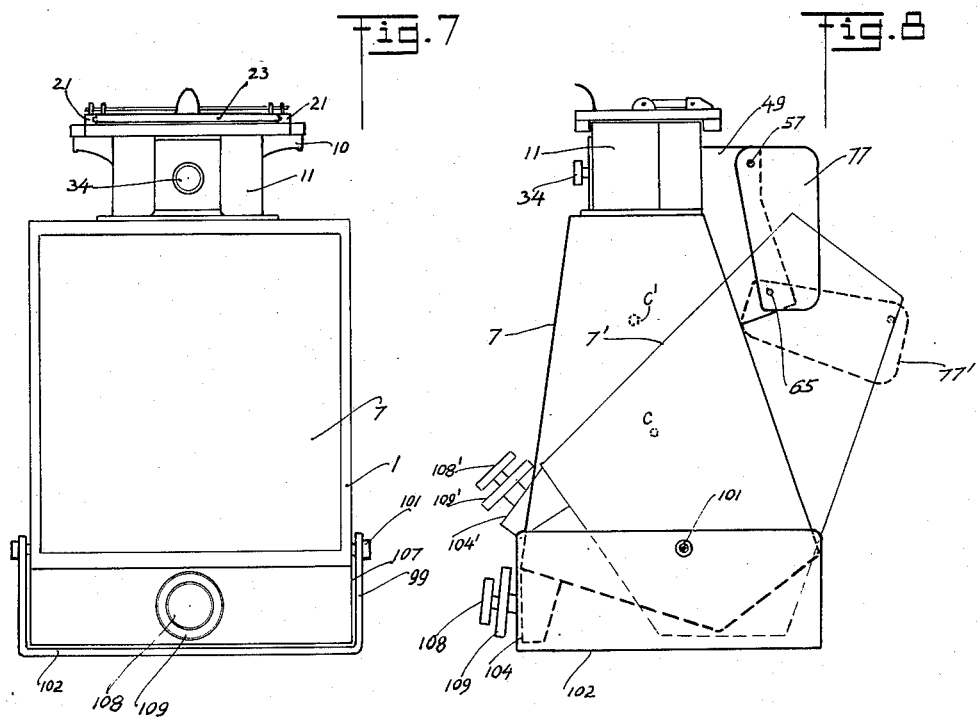
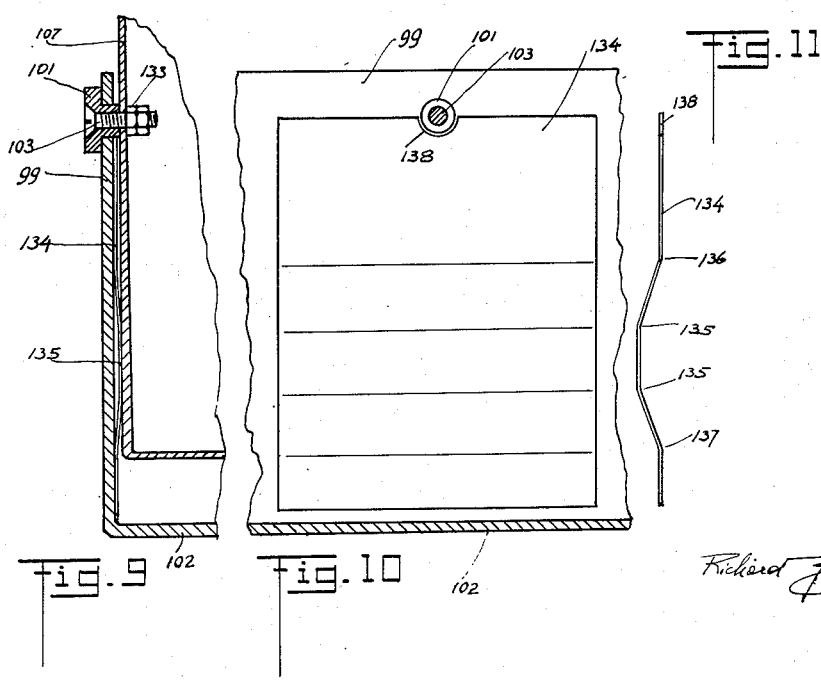
INVENTOR.
Richard Erban United States Patent Office 2,711,669
Patented June 28, 1955

2,711,669

PROJECTION APPARATUS

Richard T. Erban, New York, N. Y.

Application July 28, 1950, Serial No. 176,269

3 Claims. (Cl. 88—24)

This invention relates to projection apparatus in general and more specifically to such devices which are designed to produce an enlarged image from an opaque original, such as a miniature photograph of an object, or of a printed text or a miniature reproduction made by whatever process.

Miniature reproductions have been made using paper and also other opaque materials as a carrier, including metals; they were of different sizes and the use of a standard index card size has been suggested. Reading devices for opaque micro reproductions have been proposed in several designs, and two have appeared on the market; however, their performance, when compared with that of a microfilm reader, was very much lower, and this inferior image quality has been one of the major obstacles to a wider use of micro reproductions on opaque carriers, and so far has prevented the realisation of their great advantages in specific fields.

For the purpose of clarity of definition, as well as for saving of time and space—and since no adequate word exists to designate all kinds of micro reproductions on opaque material, whether on paper, cardboard, plastic or metal, and whether made by photographic process, or by printing (offset) or by any other process—I propose ot use the word "micropaque" hereafter to designate any of the micro reproductions outlined above.

The major shortcoming of projectors for micropaques up to now has been the lack of illumination or brightness on the screen and insufficient clearness of the projected image. With a maximum screen illumination of only 1–2 foot candle, it is virtually impossible to use any of these known machines in a normally lighted room, that is, about 8 to 16 foot candle room illumination. Libraries did not object too much against a darkened room, but today's trend in offices is to use microfilm equipment just as any other piece of equipment in a fully lighted room. The attempt to read something that has about one tenth or less of the brightness of the surrounding objects puts a heavy strain on the eyes, and this is made more acute because of the peculiar fact that the contrast ratio of a projected micropaque is only around 1:3 while the contrast ratio for a good microfilm is 1:10 and better. The lack in contrast adds to the eyestrain and makes the image appear less sharp than it actually is; this results from one of the physiological peculiarities of the human eye, which have to be compensated for if a comfortable reading machine is desired.

All attempts to increase screen brightness by stronger or more lamps caused blistering or singeing of the specimen; and the use of blowers, as well as that of low-voltage lamps, while bringing some relief, did not substantially change the light deficiency; besides, both measures added weight and cost to the reading machine, and made the design of a really portable machine virtually impossible.

The first of these difficulties, that is, not enough light on the screen, stems from the fact that a lens used for opaque projection will collect only a small fraction of the total light illuminating the image, while in projection of a film by transmitted light the same lens will gather a very high percentage of the light transmitted through the film. In opaque projection, a lens with the aperture F:3.5 will collect only 2.05% of all the light reflected by the paper miniature print, while the same lens collects easily up to 80% of the light transmitted through a film; even a lens with F:2 opening collects only a little over 6% of the reflected light. One of the known micropaque readers achieves a screen illumination of about 1 foot candle with a total lighting of 300 watt, requiring a blower. It is obvious that the screen brightness required for comfortable reading, that is, from 10 to 15 foot candles, can not be achieved by a simple increase of the light source in the ratio of 10:1 as this would burn up the machine, and there are no lamps of such power that would fit into the small space available in these machines. Replacement of the F:3.5 lens by a F:2 would still require about 5 times as much light as presently available, and the heat developed by 1500 watts would still be prohibitive. If to the requirement for a bright screen of about 100 square inches size is added the request for a portable reading machine of around 10 lbs. weight, it becomes clear that merely minor changes on present designs will not be satisfactory, but that a basically new approach was required to achieve the desired result.

Because the shortcomings of present machines as well as the difficulties and complexities inherent in the structure of a successful micropaque reader are neither well understood nor visible at first glance, I have attempted to outline at least some of the greater obstacles and their inter-relation in order to give a proper background for the achievements of the present invention. I am aware that this is only a weak substitute to an actual comparison of my new reader with the kind so far known on the market, because knowledge of certain phenomena involved in projection of micropaques is very limited and there is almost no literature about it.

The main object of my invention therefore is the effective and novel combination of a known light source with a novel condenser system, a known projection lens, new means for holding and moving the micropaque, with novel means for eliminating heat, for the purpose of achieving a reading machine for micropaques, that is readable in normally lighted rooms and will not burn or injure the micropaque.

Another object is a reading machine that will have a low weight of around 10 lbs. while having a screen of about 100 square inches size.

Another object of my invention is a reading machine which can be easily and comfortably operated by moving the micropaque at will in two directions substantially at right angles to each other, with a minimum of effort and with equal ease from either the right or left hand, and while the arm of the operator may be resting on the table.

A still further object is a reading machine which will permit the operator to load and unload the micropaque with a minimum of time loss, in a few seconds, and from any reading position, without the necessity to bring the loading tray into a special position for loading.

A further object is a structure of a machine especially adapted to a special kind of micropaques, that is, of the kind that has become known as "Microcards," which have a size identical to that of standard 3 x 5 inch index cards, with the purpose that all the special advantages inherent in this particular kind of micropaques may be fully realised.

While the accompanying drawings illustrate a machine of the special kind mentioned in the foregoing paragraph, it is to be understood that most of the novel and special structures disclosed may be incorporated singly or in combination in micro projectors for opaque projection of various other forms and purposes without leaving the scope of this present invention.

In the drawings,

Fig. 1 illustrates an elevated section of the reading machine,

Fig. 1-A illustrates a small part of Fig. 1 in an auxiliary section, seen from below, Fig. 2 is a top view of the same projector as shown in Fig. 1, with partial sections, and it is turned 90° in clockwise direction with respect to Fig. 1, because of space requirement.

Fig. 3 is a partial vertical section, in a plane parallel to the section plane of Fig. 1, of an additional detail, and the section is also turned by 90° with respect to Fig. 1, so that it is in correct position to Fig. 2.

Fig. 4 is a detail of the card holding slide in elevated cross section.

Figs. 5 and 6 illustrate curves of temperature distribution typical of two different arrangements in holding devices for micropaques.

Fig. 7 shows a front view of the reader in elevation.

Fig. 8 is a side view of this machine, illustrating the operation of the rocker base for tilting the screen.

Fig. 9 illustrates an elevated partial cross section through the pivot of the rocker base, Fig. 10 is a partial elevated view of the friction brake of the pivot mechanism, and Fig. 11 is a cross sectional view of the deflection spring of Figs. 9 and 10.

Figure 1:
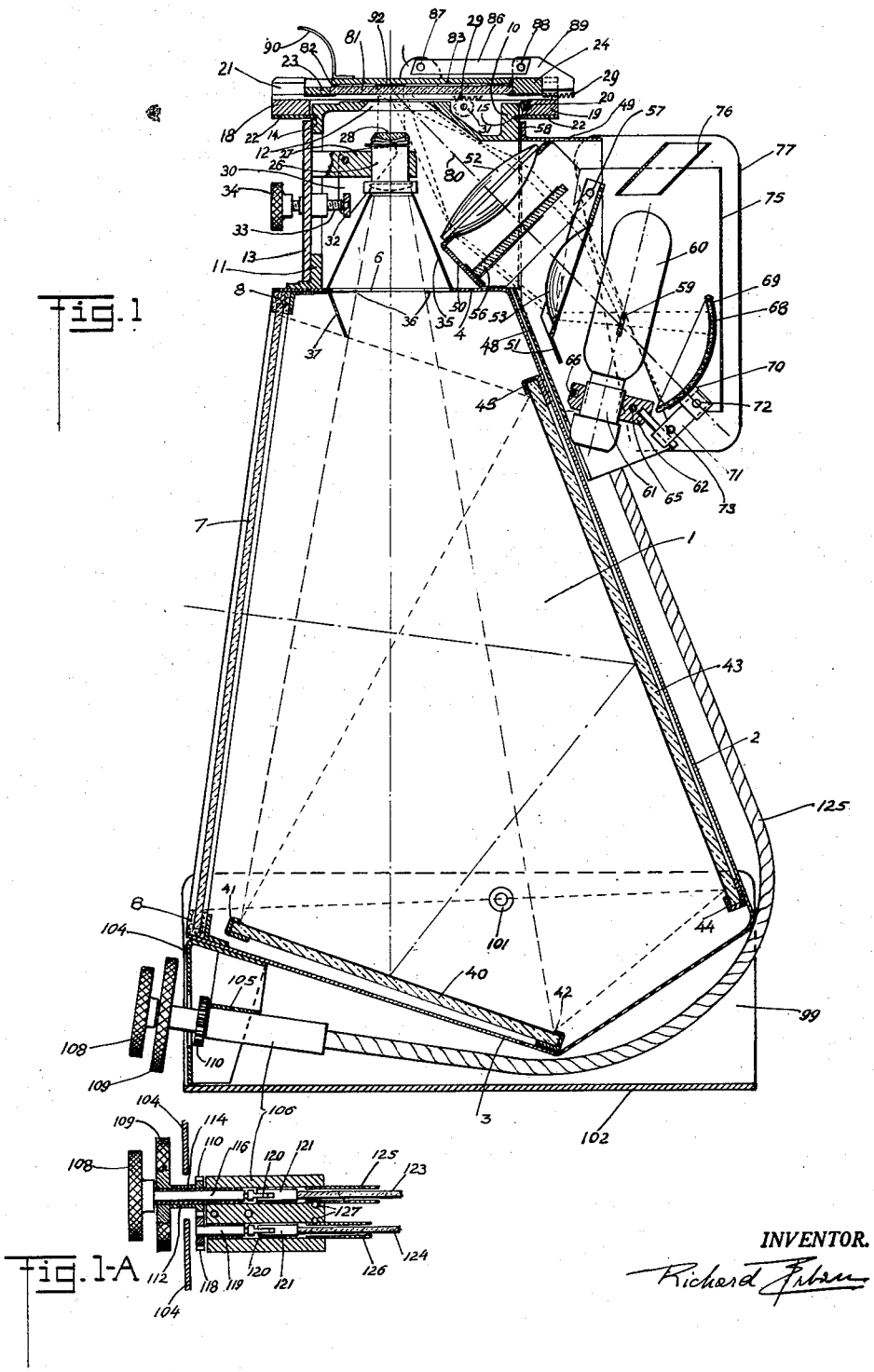

In Fig. 1, the reading apparatus consists of a wedge shaped box 1, having a rear wall 2, a bottom wall 3 and a top wall 4, and having its front wall substantially entirely formed by the screen 7. The bottom wall is bent, so as to closely follow the outlines required by the mirror 40 which is mounted inside the box by the brackets 41 and 42. From the rear bracket 42 the wall 3 follows to the lower edge and bracket 44 of the mirror 43, and then follows closely the rear contour of the mirror 43 up to the top wall 4. While the walls of the box may be slightly curved instead of straight as shown they may not deviate substantially from the outline shown without disturbing the cooperation of this specific form of the box with the other elements of the apparatus, notably the base 102, and the lamp and condenser arrangement shown inside the lamp housing 77, as will be later explained.

Carried by the top wall 4 is the projector proper, which comprises a hollow base 11, having the shape of a small box, as may be seen from Figs. 7 and 8. The top wall 4 has an aperture 6, through which the projecting beam enters the interior of the box 1. Fig. 1 shows clearly the way in which the light beam reaches the screen after two reflections on the mirrors 40 and 43. Preferably these are first surface mirrors of ground and polished plate glass.

The hollow base 11 carries in its front a plate 13 which in turn is solid with the lens mount 27, in which the projection lens 26 may slide up and down. Movement of the lens in fine increments of about .0001 inch is controlled by two triangular levers 30, which are pivoted upon the mount 27 and whose lower ends are connected by the cross bar 32. The upper edges of the levers 30 lift the lens barrel 26, while the screw 33 presses upon the center of the cross bar 32, thereby transmitting equalised pressure upon both levers to avoid tilting of the lens mount and the lens barrel; it is very important to keep the optical axis of the lens at right angles to the plane of the image to be projected, the accuracy required being about .001″ per inch, or less.

The top wall of the base 11 is provided with a window 12, which has a size slightly larger than the size of the image to be projected. On the front and rear wall respectively of the base 11 are provided guide channels or grooves 14 and 15, in which channels are fitted guide strips 22—22 so that they can slide in said grooves. These guide strips form a solid part of a frame having a front bar 18, a rear bar 19, and two side bars 21 (see Figs. 2 and 7). The side bars 21 are positioned above the level of the upper face of the base 11, so that the frame can slide with the side bars just skimming over the top surface of base 11. The side bars 21 are provided with grooves facing each other, and in these grooves slides a frame having a front portion 23, a rear portion 24, and two sides 25 (see Fig. 2). A plate glass 81 is carried by the frame 23—24—25 by the brackets 78 (Fig. 4) and above said glass is provided a lid 83, which has a double hinge connecting it to the rear part 25 of the frame. The frame has two pivot brackets 89 fastened thereto as shown and these carry pivot pins 88. Two links 86, one on each end of the lid 83, are pivotally connected to the brackets 89 and other brackets 94 which latter are fastened to the lid near its center line with respect to the glass plate 81. A hook 90 permits lifting the lid for inserting the image, or micropaque to be read, designated by numeral 82 in Fig. 4.

In order to obtain projected images which will not run out of focus when the slide carrying the card is moved, it must be provided that the micropaque rests flat against the plate 81 with even pressure over the entire surface. This is achieved by the double hinge of the lid as described and by a cam mechanism which exerts pressure independently on each end of the hinge 87 at the center line of the lid 83. While this is fully shown in Figs. 2 and 3, it is seen in larger scale in Fig. 4. In a slot 91 provided in each of the side bars 25 is journalled a cam 85, pivotable about a center 84. The cam is loaded by a spring 93, which is held by the pivot bracket 89. The cam nose 79 catches the protruding ends of the pivot bar 87 whenever the lid is lowered sufficiently, and as the lid approaches the plate 81, it is pressed against it by the action of the cam upon the pivot bar 87, see position 87′ in Fig. 4.

The rear bar 19 of the first mentioned frame is provided with a rack 20 running along the inner edge thereof as seen in Fig. 2. A cantilever shaped portion of the base 11 designated by numeral 10 (Figs. 1, 2, 7) extends beyond the base at the right and the left end, to provide a longer guiding means for the sliding frame. This cantilever bar 10 is provided with a cavity housing a gear 131 which meshes with the rack 20. The hollow base 11 is connected with the bar 10 by a tunnel shaped opening which houses part of the condenser unit, as seen in Fig. 1. At both sides of the tunnel and at the outside thereof, the bar 10 carries two brackets 16 and 17 respectively. Fig. 2 shows bracket 17 at the right and also the small spur gear 130 meshing with gear 131. It is clear that any rotation of gear 131 will cause the frame bar 19 to slide from right to left or reverse.

The movement of the slide 23—24—25 is accomplished by rack and pinion as follows: the slide carries at its under side at each end a rack, as seen in Figs. 3 and 1, where the rack is designated by 29. The rack is not shown in its entire length to avoid crowding the drawings; it extends from the rear end of the brackets 89, as shown in Figs. 3 and 4, forwards to a point between the center of the frame 23—24—25 and its front bar 23. Meshing with these two racks is a pinion rod 31 (Figs. 1 and 2, 3), which is journalled in two little blocks 54 of the side bars 21 (Fig. 2). The rear portion of the base 11, near the cantilever bar 10, carries a journal 9, in which is freely rotatable a shaft 39. The inner end of this shaft carries the spur gear 38 and outer end has a bevel gear 46. Meshing with bevel 46 is bevel 47, journalled in the bushing 128 at the end of the flexible shaft 125. The bushing 128 is held in place by a set screw (not shown) in the bracket 16 (Fig. 3). It follows that rotation of the flexible shaft of 125 will rotate the gear train 47—46—38—31—rack 29 and thereby move the glass plate 81 towards the front or the rear with respect to the hollow base 11 and the projection lens mounted therein. In Fig. 2, the slide and the glass plate are shown in the foremost position, and the top lens 28 of the projection objective is shown in dotted lines, and in this position the rearmost line of the slide, which is the topmost line of the microcard inserted in the slide, is placed opposite the projection lens, so that its image will appear on the screen. The portion of the micropaque which will be projected is comparatively small and not much larger than the front lens of the objective, due to the high aperture of the lens employed. In several hundred machines of this type which were built to the design shown, projection lenses of F:1.9 and F:1.5 were used; the extremely small depth of field of such high aperture lenses requires a very sturdy and precise structure for the object holding and object moving mechanism. The surface of the micropaque must be held within .0005 inch of its theoretically correct position if running-out-of-focus of the screen image is to be avoided. With the structure described and shown in almost correct dimensional relation, this desired result of steady images on the screen has been achieved in a practical way and with normal production methods.

While it has been pointed out that a lens with high aperture is desirable for the purpose of gathering as large as possible percentage of reflected light from the micropaque, it has been found that the cost of such lenses is not the only obstacle to still wider apertures: particularly with micropaques made by ordinary photographic process, the position of the silver grains in the emulsion, near its surface and the "pyramiding" of the grains towards the bottom of the emulsion, cause the wide aperture lens to pick up light reflected by the white paper behind the black silver grains. This light is projected as superimposed upon the image of the black silver grains, and since it is stronger towards the edges, it makes a "halo" or glare that seems to rest like a slight fog over the entire projected image, robbing it of the crisp appearance customary with microfilm projections. This phenomenon is less disturbing with micropaques made by a printing process, or certain other processes where the image is not underlayed by a transparent medium, but where the black parts rest immediately upon an opaque medium. There are several other sources of halo or glare, and it is in part inherent in the very principle of projection by reflected light. However, by following the design as outlined herein, a micropaque projector of a very high standard of performance will be obtained.

Since the amount of light to be collected is limited as above outlined to about 11% for a F:1.5 lens, the illumination of the micropaque must furnish the necessary light for a brighter screen image. It shall now be described how this is done, in accordance to my invention, without any substantial increase in the wattage. The novel light and condenser system is best seen in Fig. 1 in a specific form adapted to the requirements of a reader for 3" x 5" microcards having a magnification of 22 to 26 diameters, and a screen surface of about 90 square inches. The condenser system comprises two lenses and a reflector arranged upon an axis inclined at not over 55°, and preferably at 45° with respect to the surface of the glass plate 81. I have found that sufficiently intense illumination can be obtained from a 150 watt projection lamp, by means of very high aperture condenser lenses, and particularly by using a short focus, high aperture lens near the object to be projected. This is done in order to concentrate the entire light output of the lamp, as collected by the first condenser lens nearest the lamp and the reflector, substantially within the area of the micropaque while at the same time avoiding the formation of a definite image of the filament. If a clear image of the filament would be formed, as is usually the case with a film projector, this would here cause a very uneven distribution of light and even show an enlarged image of the filament on the screen superimposed upon the projected image of the micropaque. The highest concentration of light is obtained with any condenser of standard design at the point where the image of the filament is formed. For this reason, I take several steps to avoid the formation of a clear image of the filament at the illuminated area. One of these is to provide as the condenser lens nearest the object a lens with at least .3 numerical aperture, preferably .4 to .5, and as another step, I provide at least one of the condenser lenses inclined with their individual lens axis against the optical axis of the entire system. This is shown in Fig. 1 for the lens 53. The inclination of lens 53 serves two other purposes: Since a standard projection lamp was to be used, of a type which is useable directly for 110 or 220 volts without transformer, so that it may be used on A. C. or D. C., it is necessary to position the lamp within 25° of the vertical to avoid damage to the filament. On the other hand, the area to be illuminated is substantially horizontal, or within 30° thereof for normal useage. A conventional condenser system would require a prism or mirror arrangement to bend the light beam from its nearly horizontal axis position to one of 45° to the vertical. While this may be done, it causes increased cost, and additional loss of light. I found by actual measurement that a substantial increase of light can be obtained by using the lenses in the inclined position, as shown, as compared to a straight line condenser with prism deflector.

Another result achieved by the inclined position of the lenses is a reduction of the length of the spot illuminated at the spot 92 (Fig. 1). Due to the oblique intersection of the cone of light with the image plane of the plate 81, the section is larger than a perpendicular section of the cone, and therefore the light intensity is reduced almost by the cosinus of the angle. This is in part compensated by lens inclination, which distorts the image of the filament so as to shorten it. At the same time, this distortion is combined with an increased astigmatic aberration, which effectively destroys a good image of the filament and causes a good intermingling of rays; the summary of these effects is a highly uniform illumination at the spot 92, in spite of the fact that the entire light output is concentrated in an area not larger than 2 or 3 times the filament size in the lamp itself.

In this way I have concentrated the entire light output of a 200 watt lamp, as collected by a 0.45 aperture condenser lens and a 55% reflector, within an area of .3 square inches while achieving even illumination. A microcard so illuminated gave with a F:1.9 lens an image brightness on the screen of 15–17 foot candle, and with a 150 watt lamp from 11 to 14 ft. candle, the values changing depending on whether anti-reflection coating is used in the condenser system.

Fig. 1 shows that lens 52 is held by the housing 50 which forms part of the condenser housing 48—49. A heat absorbing filter 56 is positioned between lens 52 and the first lens 53. It is to be understood that due to the special means employed in the card slide, for eliminating the heat of the illuminated spot 92 which shall be later explained, it is possible to operate this machine without any heat filter altogether, without causing any burns on the object. In that case, precaution must be taken not to expose the micropaque to the light until the lid 83 is closed and in good contact with it. Of course the heat absorption by the micropaque depends upon the shade of it, pure white absorbing less and heating slower than black. However, the heat diffusion of the lid structure as herein disclosed is so effective that a black paper will heat up only within safe temperatures (below 180°) even without a heat filter and using a 200 watt lamp, while it will burst into flame within 2 seconds with the lid open. The great amount of heat developed by a 150 or 200 watt lamp must be eliminated rapidly if overheating of the entire projector is to be prevented.

I provide for this purpose a special lamp housing design which gives a highly effective chimney effect while keeping all adjoining parts at a low temperature. The lens 53 which is directly exposed to the lamp heat is supported by two pins, only one of which is shown at 57; these are of low heat conductive material. The support plate 51 is so shaped that it forms two airstreams, a larger one near the lamp and a smaller one between the lens and the filter 56. The main airstream, which is formed inside the chimneylike heat baffle 75 finds a larger cross section all around the lamp 60, and is only slightly deflected at the top by the louvres 76. This deflection creates a suction effect in the lamp housing part right above the pin 57, thereby withdrawing hot air from the airstream flowing behind the lens 53. In order to further reduce the resistance of the lamp housing to airflow, the lamp socket 61 is held in a streamlined socket 62 and this in turn is held by two pins 65 and 66, so that the major portion of the cross section inside the heat baffle 75 is unobstructed to the airflow.

The reflector 68 is held in a mounting 69 which in turn has a bracket 70. This is adjustably held by a screw 72 clamped to the link 71; this link is slidable axially and adjustable angularly upon a pin solid with the lamp socket support 62 (Fig. 1). In this way the reflector is adjustable in all three directions, sideways, up and down, and near or far from the filament 59 of the lamp 60. This is important because only if well adjusted will the reflector give a light increase between 50 and 60%. This adjustment can be most comfortably made by opening the lamp housing 77. Fig. 8 illustrates this clearly; lamp housing 77 is hinged permanently upon the pin 62, and has in its upper part a hole on each side which may be slipped over the protruding end of the pin 57 by pulling the two side walls of the lamp housing slightly apart and letting them snap into place. With the lamp housing in the lowered position as shown at 77' (Fig. 8), the reflector 68 with its adjustments as well as the lamp 60 are easily accesible. Exchanging a burned out lamp is a matter of a few minutes.

While the portion 48—49 of the lamp and condenser housing does not receive the direct impact of radiating heat, it nevertheless would transmit enough heat to the hollow base 11, and particularly to the bar 10, that binding of the slide 22 in the guide slot 15 may occur, since the tolerances, or clearances between these parts are very small (.001 to .002). Therefore, an insulation gasket 58 is inserted between the part 48 and the rear flange of the hollow base 10. A machine with the structure as described has been kept in operation with a 200 watt lamp for periods of 4-6 hours without interruption, and without heating any part that may be touched to more than 116 to 124° F.

Fig. 2 gives a top view of the lamp housing from which further details may be seen and which illustrates the way in which the lamp housing 77 and the heat baffle 75 are arranged to insure a minimum of heat transfer from 75 to 77.

Figs. 5 and 6 illustrate how the heat withdrawal from the lid, or more correctly, through the lid from the illuminated object is obtained, so as to prevent burning.

Essentially, the problem is caused by the gradual accumulation of heat and build-up of temperature in the illuminated area 192 of the micropaque 182. The glass plate 181 being a poor conductor of heat, it can not carry off much heat, although it somewhat reduces the temperature of the thin sheet 182. The beam of rays 190, which converge upon area 192 carry with them a definite amount of energy which transforms into heat if it is absorbed fully. I use a lid plate 183 made of a material of good heat conductivity, and moreover, made with such cross sections that the flow of the maximum amount of energy (erg or B. t. u.) available through the beam 190 is carried off with a temperature gradient sufficiently low, to keep the temperature of the central spot at a predetermined figure within the safe limits. It is also obvious that in order to make this as easy as possible, the radiation of any unnecessary amount of energy to 192 should be prevented by stops, such as 194.

If the thickness, or the cross section available for the heat flow away from 192 is reduced, or a material of low heat conductivity employed for the lid 183, then a greater temperature gradient, in inverse proportion to the increased resistance to heat flow, will build up over the area 192. For a lid with a heat resistance three times as great than in Fig. 5, the temperature will reach nearly three times the value as compared to Fig. 5. This is illustrated in Fig. 6, where the thickness of the lid 283 has been shown as ⅓ of lid 183 in Fig. 5, while the incident beam 190 and transmitted energy are assumed to be the same. The increase of the local temperature in the illuminated area 192 (or 292, numerals similar to 92 designating the area in Fig. 1) may be just enough to cause singeing of the object. If 180 to 200° F. are considered safe temperatures, it is obvious that 560-600° F. are well beyond the safe point.

Returning to Fig. 1, the operation of the card movement in order to read from any part of a microcard's surface is achieved with the purpose of making it the most convenient and effortless to the operator. Prolonged experimentation with different types of controls, on microfilm reading machine and other types have led me to the conclusion that fatigue is caused primarily by controls that require lifting of the hands of the operator, and of changing the location of the hands. Also that pulling or pushing knobs is fatiguing, particularly when the arm has to be lifted to accomplish this. As a result of careful motion studies, I have devised the control here disclosed, which consists of two almost identical knobs that are operated by turning, one operating one directional movement only. They are placed closely adjacent to each other, so that they may be operated by one hand—either hand—without the hand having to be lifted or changed in its location, the operation being done by several fingers of one hand which may be used even simultaneously for turning both controls at the same time. The design is such that the controls are operated by sliding one or two fingers over the periphery of the respective knob, taking it along by friction of the knurled surface without requiring to grip it across a diameter. In doing this the hand operating the controls may rest on the table and the fatigue is at a minimum.

The two knobs are shown at 108 and 109 in Figs. 1 and 1-A. The front knob 108 has a shaft 116 which journalled in a bushing 114 protrudes from the block 106. This block is fastened by screws (not shown) to the bracket 105 located under the bottom wall 3 of the reader box 1. An apron part 104 closes the front space beneath the wall 3 and has an aperture through which the shafts of the knobs pass. Shaft 116 is connected by a tongue 120 with a coupling 121, fastened to a flexible shaft 123; a casing 125, held by a set screw 117 in the block 106 protects the shaft 123. In turn, shaft 123 passes around the box 1 and ends in a head or bushing 128, in which is journalled the bevel gear 47 as previously described. Therefore, turning the knob 108 will cause movement of the slide holding the micropaque forwards or to rearwards, and the image on the screen will accordingly move up or down.

Knob 109 is provided with a sleeve shaft 112, which is journalled upon the outside of the bushing 114. This sleeve shaft carries a gear 110, meshing with a gear 113 which in turn is fast upon a shaft 119, journalled in the block 106 adjacent to the shaft 116. By a feather and tongue arrangement it drives the flexible shaft 124, covered by casing 126; this flexible shaft ends at the upper end in a journal similar to the one described, but situated on the right side of the lamp housing as seen in Fig. 2. The journal is designated 129 and carries the spur gear 130, previously described. It follows therefrom that turning the knob 109 will cause the slide to move from right to left, or what may be termed longitudinally; the movement caused by the knob 108 may be called transversely.

It is important for the controls to enable the most efficient work to be done by the operator to be placed near the edge of the screen, and the lower edge at that. I am aware that controls have been placed in front of reading apparatus, and near the edge of the screen, but they were not the type of controls for which this would be the most advantageous place from the standpoint of a motion study. They were swinging levers, or push-pull, needing arm movement, or they were knobs requiring both hands etc. I have seen a high speed typist working from a microfilm reader to refuse to operate the scanning because it required changing location of the hand by about 4 inches; this caused too much loss of time in operation.

In Fig. 1 the box 1 is shown held by a base piece 102 which is connected to it by a pivot 101, located in the side walls 99 of the base 102. This is more clearly seen in Figs. 7 and 8, with details shown in Figs. 9, 10 and 11. The base 102, for which the name rocker-base has become the accepted functional name, is a U shaped member having a flat bottom 102 and two upright walls 99 which are placed slightly wider apart than the width of the box 1, measured over the outside walls 107. Two pivots 101 are rigidly held by a locked screw 103—133 to the wall 107 on each side; while the flanges of 101 bear against the outside of the walls 99. A friction brake in the form of a thin, deflected resilient sheet 134, is inserted in the space between the walls 99 and 107 on each side, so that the raised central portion, 135—135, Figs. 11 and 10, bears against the wall 107.

The location of the pivot 101 is important, in that it must be located between ½ and ⅓ the distance between the center of gravity of the box itself and the bottom, and also somewhat behind a vertical plane through the said center.

This position of the pivot center, narrowly confined as described, achieves the following results: it will permit the screen to be tilted to about 45° from its normal position of about 10° to the vertical, while still maintaining a stable equilibrium for the machine and prevent it from falling over. It prevents more tilting by the rear end of the bottom wall acting as a stop. Furthermore, it distributes the unbalance and therewith the braking effect to be exercised by the part 134 almost evenly over the most used positions of inclination, that is from about 80° to 60° for the screen inclination. So that a comparatively slight braking effort can be used and the movement of the box for adjustment of angle can be had by a moderate push with the hand.

The maximum inclined position of the box 1 is illustrated in Fig. 8 and shown in thin full lines, and all parts designated with their original numerals plus a ' (prime). It will be seen that the controls are adjustable with the screen for angular position, so as to always remain in easy reach from the operator.

Whereas I have described my invention and the way in which it may be carried out in connection with specific forms of applications, it is understood that I do not in any way limit my invention to these specific examples here described, and that the scope of my invention shall not be limited except as defined by the following claims.

I claim:

1. The combination with a micro image projector comprising a screen and mirrors arranged to direct the projection beam into said screen and a box closely enveloping said mirrors and holding them in fixed relation to said screen, said box being generally wedge shaped and having side walls substantially diminishing in width towards the top, of a base generally U shaped and having its side walls closely adjacent to the side walls of said box, and pivots adjustably connecting said box to said base, said pivots being positioned respectively in each of the two side walls of the said box at a point below the center of gravity of the said side walls and substantially halfway between said center of gravity and the lowest point of the bottom of said box.

2. The combination with a micro image projection device, of a substantially U shaped base, said projection device comprising a projector proper, a screen and mirrors for directing said projection beam onto said screen, a box holding said projector, said mirrors and said screen in predetermined relation to each other, said box having two side walls substantially at right angles to said screen, said box being fitted between the upright parts of said U-shaped base so that the lower portion of each of said two side walls respectively is positioned narrowly spaced from one of said upright parts of said base, a pivot connecting each of said side walls with the respective upright, and resilient friction means inserted in said narrow space between said side walls and said uprights.

3. The combination with a micro-image projecting device, of a base having two flat upright parts substantially parallel to each other so as to form a U shape between them, said projection device comprising a projector proper, a screen and mirrors for directing the projection beam onto said screen, a casing holding said projector, said mirrors and said screen in predetermined relation to each other, said box having two walls substantially parallel to each other and substantially at right angles to the horizontal part of said base, the upright parts of said base being narrowly spaced from said parallel walls, friction members inserted in said spacing between said parallel walls and said upright parts of the base, and means extending through the rocker pivots for causing the application of pressure upon said friction members.

References Cited in the file of this patent

UNITED STATES PATENTS

| 785,851 | Balderston | Mar. 28, 1905 |
| 1,460,071 | Merriman | June 26, 1923 |
| 1,530,173 | Harris | Mar. 17, 1925 |
| 1,891,052 | Ott | Dec. 13, 1932 |
| 2,263,025 | Young | Nov. 18, 1941 |
| 2,285,644 | Bernzott | June 9, 1942 |
| 2,493,998 | Pratt | Jan. 10, 1950 |

FOREIGN PATENTS

| 496 | Great Britain | Feb. 6, 1877 |
| 13,467 | Great Britain | June 16, 1903 |